(12) United States Patent
Evans

(10) Patent No.: US 7,299,419 B2
(45) Date of Patent: Nov. 20, 2007

(54) APPARATUS AND METHOD FOR COMBINING DISCRETE LOGIC VISUAL ICONS TO FORM A DATA TRANSFORMATION BLOCK

(75) Inventor: Luke William Evans, West Vancouver (CA)

(73) Assignee: Business Objects, S.A., Levallois-Perret (FR)

( * ) Notice: Subject to any disclaimer, the term of this patent is extended or adjusted under 35 U.S.C. 154(b) by 718 days.

(21) Appl. No.: 10/183,898

(22) Filed: Jun. 25, 2002

(65) Prior Publication Data

US 2003/0071844 A1 Apr. 17, 2003

Related U.S. Application Data

(60) Provisional application No. 60/326,176, filed on Sep. 28, 2001.

(51) Int. Cl.
*G06F 3/00* (2006.01)
*G06F 3/14* (2006.01)
*G06F 9/44* (2006.01)

(52) U.S. Cl. ............... 715/763; 715/810; 715/835; 715/837; 715/967; 717/106; 717/109; 707/1

(58) Field of Classification Search ........ 715/762–765, 715/810, 835, 837, 846, 967, 700; 707/102, 707/104.1, 1; 709/204, 205; 717/106–116
See application file for complete search history.

(56) References Cited

U.S. PATENT DOCUMENTS

| 4,796,179 | A | * | 1/1989 | Lehman et al. ............... 700/86 |
| 5,485,600 | A | * | 1/1996 | Joseph et al. ................. 703/13 |
| 5,752,033 | A | * | 5/1998 | Suda et al. ................... 717/109 |
| 5,861,882 | A | * | 1/1999 | Sprenger et al. ............ 715/700 |
| 5,862,379 | A | * | 1/1999 | Rubin et al. ................. 717/109 |
| 5,933,637 | A | * | 8/1999 | Hurley et al. ............... 717/107 |
| 6,054,986 | A | * | 4/2000 | Kato ........................... 715/763 |
| 6,064,816 | A | * | 5/2000 | Parthasarathy et al. ..... 717/109 |
| 6,151,643 | A |   | 11/2000 | Cheng et al. |
| 6,275,976 | B1 | * | 8/2001 | Scandura ..................... 717/120 |
| 6,282,699 | B1 |   | 8/2001 | Zhang et al. |
| 6,334,211 | B1 |   | 12/2001 | Kojima et al. |
| 6,366,300 | B1 |   | 4/2002 | Ohara et al. |
| 6,385,769 | B1 |   | 5/2002 | Lewallen |

(Continued)

FOREIGN PATENT DOCUMENTS

JP 10-69379 * 3/1998

(Continued)

*Primary Examiner*—X. L. Bautista
(74) *Attorney, Agent, or Firm*—Cooley Godward Kronish LLP

(57) ABSTRACT

A method of constructing a data transformation block includes selecting a first discrete logic visual icon and a second discrete logic visual icon from a logic repository. A combination valid state is established when the first discrete logic visual icon can be combined with the second discrete logic visual icon. The first discrete logic visual icon and the second discrete logic visual icon are combined in response to the combination valid state to form a data transformation block. The data transformation block has a corresponding functional language source code description of the logical operations to be performed by the data transformation block. The data transformation block processes data to form transformed data. The data transformation block may be stored in the logic repository so that others can access it.

26 Claims, 8 Drawing Sheets

U.S. PATENT DOCUMENTS

| | | | |
|---|---|---|---|
| 6,396,517 B1 * | 5/2002 | Beck et al. | 715/771 |
| 6,437,805 B1 * | 8/2002 | Sojoodi et al. | 715/763 |
| 6,760,842 B1 * | 7/2004 | Miller et al. | 726/26 |
| 6,922,824 B2 * | 7/2005 | Swetland | 717/117 |
| 2002/0069399 A1 * | 6/2002 | Miloushey et al. | 717/108 |
| 2002/0095653 A1 * | 7/2002 | Parr et al. | |
| 2002/0196283 A1 * | 12/2002 | Petruk et al. | 345/763 |
| 2003/0035010 A1 * | 2/2003 | Kodosky et al. | 345/771 |
| 2003/0101025 A1 * | 5/2003 | Shah et al. | 702/188 |
| 2004/0267515 A1 * | 12/2004 | McDaniel et al. | 703/22 |

FOREIGN PATENT DOCUMENTS

| | | | |
|---|---|---|---|
| JP | 10069379 | * | 3/1998 |

\* cited by examiner

APPARATUS AND METHOD FOR COMBINING DISCRETE LOGIC VISUAL ICONS TO FORM A DATA TRANSFORMATION BLOCK

This application claims priority under 35 U.S.C. §119(e) to U.S. Provisional Application No. 60/326,176, filed on Sep. 28, 2001, the entire content of which is hereby incorporated by reference.

BRIEF DESCRIPTION OF THE INVENTION

This invention relates generally to the processing of information. More particularly, this invention relates to the use of an icon-based programming technique to facilitate the processing of business information.

BACKGROUND OF THE INVENTION

All tasks performed on a computer can be viewed as processing information. There are ways of characterizing these different information processing tasks. One class of information processing can be defined as "business logic". "Business logic" is a subset of general programming where the objective is the transformation and interpretation of large volumes of data. The challenges or business logic are to perform rapid analyses or to prepare the data so that an individual can more easily interpret it. In this regard, it can be said that business logic differentiates itself from general computing by being data centric. Business logic commonly includes the tasks of exploring, abstracting, alerting, automating, reducing, and directing.

Exploring is the process of helping a user to find interesting features in data. This is achieved through other tasks, such as abstracting. Abstracting creates new data (consolidations, measures, and metrics) from base data. The new data shows the user key facts about the data in ways that are appropriate to a job function and/or workflow. For example, abstracting includes consolidating transactional data so it is shown monthly, or by sales region.

Alerting is another business logic task. Alerting detects patterns or thresholds in data and triggers an event that will notify the user (with an appropriate example or amplification) that a pattern exists. For example, having a rule that highlights or notifies a manager when inventory exceeds a predetermined number of units is an example of alerting.

Automating is another business logic task. Automating involves encapsulating common models of analysis that can very easily be applied by anyone wishing to produce the same metric or derived data. An example of automating is having the finance department capture its specific (customized) accounting models as a set of named objects so that others in the organization can apply these to get the uniform version of a business metric.

Reducing is still another business logic task. Reducing involves filtering information so as to avoid 'information overflow'. For example, a data filter that automatically reduces the data to show only the financial products offered by a particular branch office is an example of reducing. Another example of reducing is a filter that only shows data items flagged by the alerting rules.

A final business logic task is directing or navigation. Directing indicates to the user useful views on the data based on a combination of patterns, alerts, roles and the like. Directing also provides navigation routes through the data for the user to follow as the meanings and patterns in data are explored. For example, directing includes an analytical routine that decides on and directs the automatic generation of reports specifically to highlight data features based on user role and dynamics in the data. Another example of directing is to allow a user to see progressively more detail in order to determine emerging cause and effect relationships.

These common business logic tasks of exploring, abstracting, alerting, automating, reducing, and directing require different programming instructions. It is difficult to train individuals in a business organization to effectively program these different business logic tasks. Therefore, there is an ongoing need to simplify the process of defining business logic tasks. Once a business logic task is defined, it is desirable to have that task available in a recognizable form so that it can be utilized throughout a business organization.

SUMMARY OF THE INVENTION

The invention includes a method of constructing a data transformation block. In accordance with the method, a first discrete logic visual icon and a second discrete logic visual icon are selected from a logic repository. A combination valid state is established when the first discrete logic visual icon can be combined with the second discrete logic visual icon. The first discrete logic visual icon and the second discrete logic visual icon are combined in response to the combination valid state to form a data transformation block. The data transformation block has a corresponding functional language source code description of the logical operations to be performed by the data transformation block. The data transformation block processes data to form transformed data. The data transformation block may be stored in the logic repository so that others can access it.

The invention also includes a computer readable memory to direct a computer to function in a specified manner. The computer readable memory has a logic repository storing a set of discrete logic visual icons. The computer readable memory also has a set of executable instructions. First executable instructions selectively produce a combination valid state when a first discrete logic visual icon from the logic repository can be combined with a second discrete logic visual icon from the logic repository. Second executable instructions combine the first discrete logic visual icon and the second discrete logic visual icon in response to the combination valid state to form a data transformation block. The data transformation block has a corresponding functional language source code description of the logical operations to be performed by the data transformation block.

The icon-based programming methodology of the invention simplifies the process of defining business logic tasks, such as exploring, abstracting, alerting, automating, reducing, and directing. The functional language source code associated with the icons provides an intuitive and efficient vehicle for expressing logic. The functional language utilized in accordance with the invention also facilitates processing efficiencies, such as parallel processing. The strongly typed nature of the functional language is exploited to control the combination of icons and to produce logic blocks that can operate on different data types. Advantageously, the data blocks formed in accordance with the invention can be re-used throughout a business organization.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
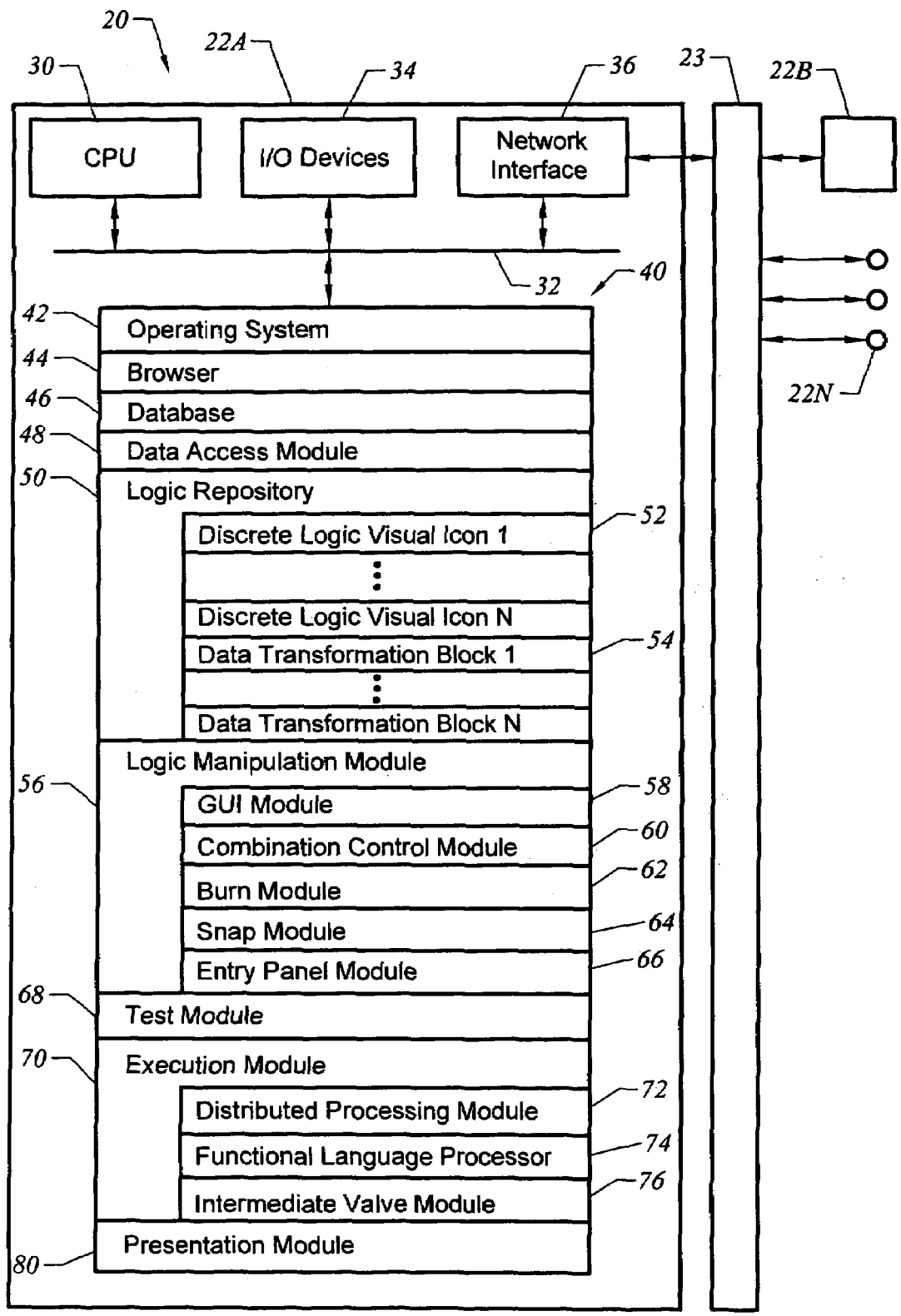
FIG. 1 illustrates a computer, operative in a networked environment, which is configured in accordance with an embodiment of the invention.

FIG. 1 illustrates a networked environment 20 including a set of computers 22A-22N connected via a transmission channel 23, which may be any wired or wireless pathway. Computer 22A is an example of a computer configured in accordance with an embodiment of the invention. The remaining computers in the networked environment 20 may be configured in an identical or alternate manner.

Computer 22A includes a central processing unit 30 connected to a set of input/output devices 34 via a system bus 32. By way of example, the input/output devices 34 may include a keyboard, mouse, touch screen, video monitor, flat panel display, printer, and the like. A network interface circuit is also connected to the system bus 32. Further, a memory 40 is connected to the system bus 32.

The memory 40 stores a set of executable programs, including an operating system 42 and a browser 44. A database 46 is also stored in the memory 40. A data access module 48 may be used to read and write information to and from the database 46. The components of FIG. 1 discussed up to this point are known in the art. The invention is directed toward the remaining executable modules that are stored in memory 40.

Memory 40 includes a logic repository 50. The logic repository stores a set of discrete logic visual icons 52. Each discrete logic visual icon represents a discrete logical operation. The visual icon has associated executable code that is used to implement the discrete logical operation. As shown below, these individual discrete logic visual icons can be combined to create data transformation blocks 54. In general, the discrete logic visual icons are primitive operations that may be combined to form the more complex or tailored operations associated with the data transformation blocks 54. The data transformation blocks 54 may be combined with discrete logic icons or other data transformation blocks to form new data transformation blocks. This icon-based programming methodology is easy to use, thereby allowing large numbers of individuals to participate in programming operations.

Each of the data transformation blocks is preferably stored in the logic repository 50 so that they may be accessed over the network. Thus, in the example of a business, a single business may develop a set of customized data transformation blocks that are shared throughout the business organization.

The memory 40 also stores a logic manipulation module 56. The logic manipulation module 56 governs the combination of discrete logic visual icons 52 with one another and/or with data transformation blocks 54. The logic manipulation module 56 is a runtime environment that can be considered to include a number of modules.

The logic manipulation module 56 may include a graphical user interface module 58. The graphical user interface module 58 includes executable code to supply a graphics-based interface, examples of which are provided below. The logic manipulation module 56 also includes a combination control module 60. The combination control module 60 confirms the legitimacy or legality of proposed combinations of discrete logic visual icons with one another or with data transformation blocks. The combination control module 60 prevents the formation of illegal combinations of logical elements. This operation is performed in a run time environment, not at the time of compiling. Therefore, the user is continuously reassured during the logic construction process of the efficacy of the data transformation block. As discussed below, the type system of the functional language utilized in accordance with the invention may be used by the combination control module 60 to identify valid combinations of logical elements.

The logic manipulation module 56 further includes a burn module 62. The burn module 62 automatically establishes connections between logical elements that are to be combined when there is no ambiguity with respect to how those elements can be combined. This feature automates and otherwise simplifies the logic construction process. The burn module 62 may also rely upon the type system associated with the functional language utilized in accordance with the invention.

The snap module 64 facilitates connections to input and output ports of the logical elements, as shown below. The snap module 64 may be used to control the drawing of physical links between ports. Preferably, the appearance of the physical links is altered when a valid connection is established.

The entry panel module 66 provides an interface for entering values at the input of a logical element. As discussed below, the entry panel module 66 supplies a variety of entry panels. Various entry panels provide data type information, as discussed below.

After a data transformation block is formed, a test module 68 may be invoked to test the new logical unit. An execution module 70 processes the functional language source code description associated with the data transformation block. More particularly, the execution module 70 processes the functional language source code in connection with an input data stream to produce transformed data.

In a preferred embodiment, the execution module 70 includes a distributed processing module 72. The distributed processing module 72 determines where the data transformation block will be processed. For example, the distributed processing module 72 includes heuristics to determine whether the data transformation block should be sent to a source of the data instead of migrating the data to the data transformation block. In addition, the distributed processing module 72 determines whether the logic associated with the block should be distributed across the network 20. Recall that the data transformation block includes a set of discrete logic visual icons, each of which has a corresponding executable code segment. The different executable code segments may be stored in memory 40 of computer 22A or they may be stored in different computers 22B-22N in the network 20. The distributed processing module 72 is used to assess whether the individual executable code segments should be processed at their local computer or if the code segments should be migrated to a central computer for execution. Where appropriate, the distributed processing module 72 exploits parallel processing across the network 20.

The execution module 70 also includes a functional language processor 74. As discussed below, the invention is implemented using a functional computer language. A functional computer language is a computer language in which each term in the language is treated as a function. Functional computer languages have been widely used in academia, but the incorporation of a functional language into an icon-based programming methodology is believed to be novel. The invention provides a customized functional computer language optimized for business logic computations. As discussed below, the functional language utilized in accordance with the invention has a very simple syntax, no global variables, an algebraic type system, all of which facilitate a massive reuse of logic.

The functional language processor 74 supports the interpretation and execution of the functional computer language. Known functional language interpretation techniques may be used in accordance with the invention. For example, a graph reducing methodology may be used to process the functional language source code.

The execution module 70 also includes an intermediate value module 76. The intermediate value module 76 supplies intermediate or incomplete results during the processing of a data transformation block. The manner in which the functional language is processed allows the intermediate results to be supplied. For example, if a graph reducing methodology is used to process the functional language source code, intermediate results are available as different branches of the graph are processed. Thus, the user receives a streaming set of information prior to obtaining the final results from the data transformation block.

FIG. 1 also illustrates a presentation module 80. The presentation module 80 uses standard techniques to present the transformed data from the data transformation block. The transformed data may be presented on one of the output devices of the input/output devices 34.

The modules 50-80 within memory 40 facilitate the processing of the present invention. The modules of FIG. 1 have been isolated in an arbitrary manner. The individual modules may be formed as a single module or as a different combination of modules. The modules of FIG. 1 are included for the purpose of highlighting the different functions performed in accordance with the invention. These functions may be implemented in any number of ways in view of the disclosure provided herein.

Figure 2:
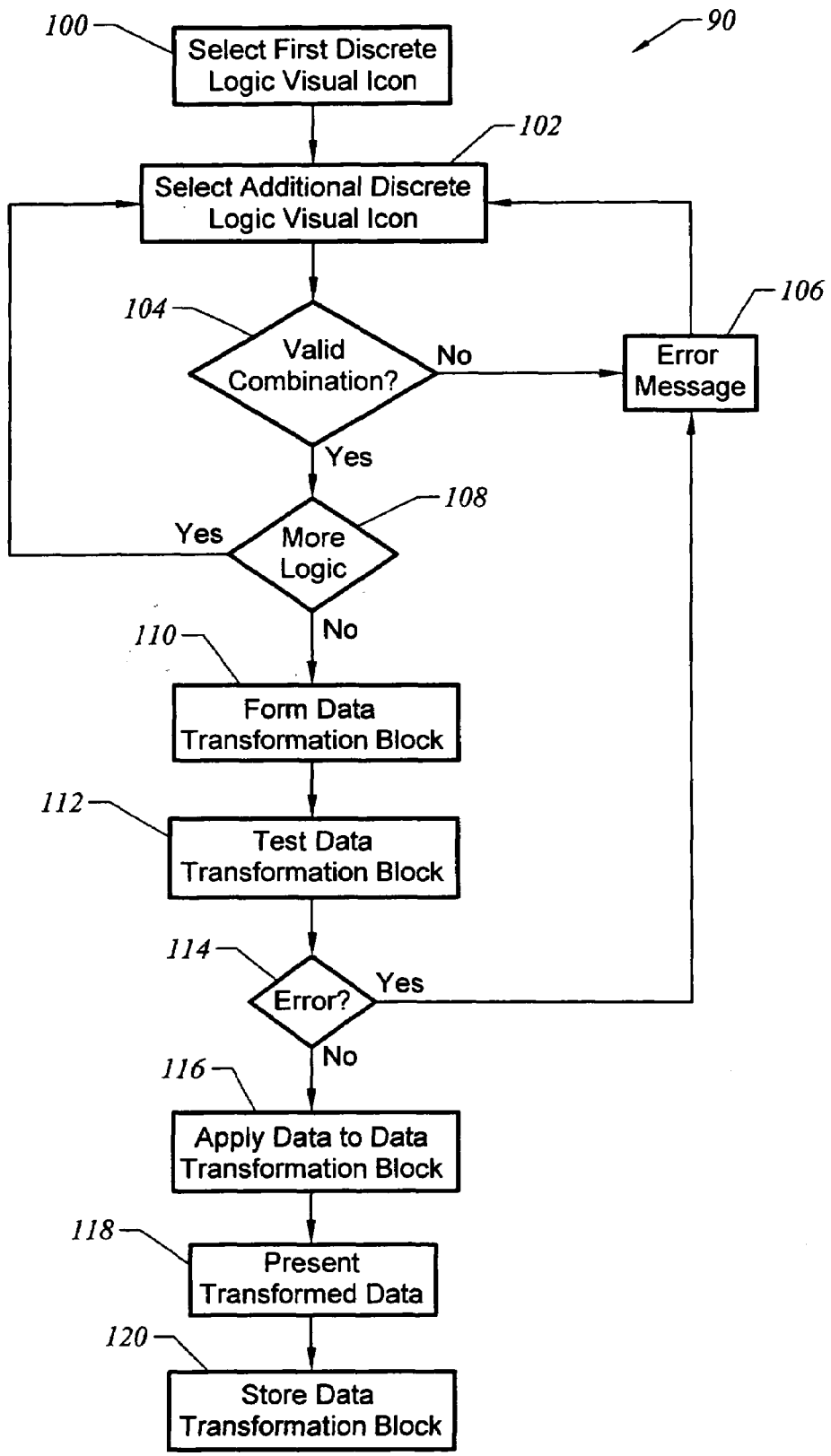
FIG. 2 illustrates processing steps performed in accordance with an embodiment of the invention.

FIG. 2 illustrates processing steps performed in accordance with an embodiment of the invention. The process 90 of FIG. 2 includes a first step of selecting a first discrete logic visual icon (block 100). The discrete logic visual icon 52 may be stored in memory 40 of computer 22. An additional discrete logic visual icon is then selected (block 102). This icon may also be selected from logic repository 50.

Once the two objects have been selected, a decision is made to determine whether they represent a valid combination (block 104). The combination control module 60 of the logic manipulation module 56 may be used to implement this operation. If the combination is not valid, an error indication is provided (block 106) and control can return to block 102. By way of example, the error indication may be in the form of not allowing the components to snap together.

If the combination is valid, the system waits for more logic to be selected. If more logic is selected, the processing returns to block 102. If more logic is not selected, then a data transformation block is formed (block 110). The data transformation block may then be tested (block 112). The test module 68 may be used for this operation.

If an error occurs, then an error message is produced (block 106); otherwise, data can be applied to the data transformation block (block 116). The execution module 70 may be used to coordinate this operation. The resultant transformed data may then be presented on an output device of the input/output devices 34 (block 118). The presentation module 80 may be used for this operation. Finally, the data transformation block may be stored (block 120). In particular, the data transformation block may be stored in logic repository 50. This allows the data transformation block to be used by others for subsequent data transformations. In addition, by storing the data transformation block in the logic repository 50, it can be used to form new data transformation blocks.

The general configuration and operations associated with an embodiment of the invention have now been described. Attention presently turns to different examples of implementations of the invention so that the nature of the invention can be more fully appreciated.

The discrete logic visual icons of the invention are also referred to herein as gems. The data transformation blocks are also referred to at times as being gems. A gem is simply a function. A function is a mathematical concept that takes one set and 'maps' it onto another set. Simply put, this means that a gem takes an input and produces an output. Functions are not new in computing. However, in the gem framework of the invention everything is a function, including the data. This keeps everything extremely simple and well ordered.

The Gem framework is predicated upon a functional programming language utilized in accordance with the invention. A functional programming language is a computer language in which everything is expressed as a function. Functional programming languages have been used in the prior art. However, the present invention relies upon a functional programming language tailored to support the iconic programming environment of the invention. The details of the functional programming language of the invention are provided below.

A gem of the invention is a named function that can be applied to data, can define the content of a field, or can be executed to perform some transformation to the data. To do this simply involves picking the gem from a browser or using a wizard to find and apply a gem for the correct function. At design-time, the true nature of a gem is exposed in order to permit editing and abstraction.

Figure 3:
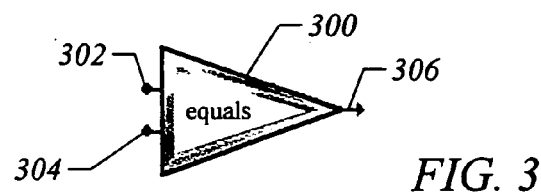
FIGS. 3-4 illustrate gems that may be utilized in accordance with an embodiment of the invention.

FIG. 3 illustrates an example of a gem 300. The gem 300 has two input ports 302 and 304 and an output port 306. This gem is called "equals"; it takes two inputs and produces a boolean result (i.e., 'true' or 'false') indicating whether the two inputs are equal.

Figure 4:
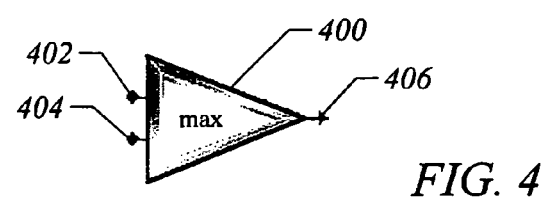

FIG. 4 illustrates an example of another gem 400. The gem 400 has two input ports 402 and 404 and an output port 406. The output port 406 has a different configuration than the output port of FIG. 3. In particular, the output port of FIG. 4 is thicker to indicate that the output value is of a different type. Color-coding or any other type of schema may be used to signify this difference in output types.

Type is an input concept associated with the invention because it is used to determine if two gems are compatible and can be meaningfully connected. The configuration of a port (e.g., its size or color) is a secondary indicator of type. To get the specific type information, one can look up the gem's reference description (which includes notes about its action, plus a description of types), or one can roll-over the connectors with the mouse, which preferably results in the type description being displayed in a window adjacent to the connector. In FIG. 3 the output 306 is a boolean value type, while the output 406 of FIG. 4 is a double precision, floating point number.

The problem with this 'monolithic typing' approach is that there has to be a gem with a particular type configuration that performs the function required. This leads to an explosion in the number of gems that have to be provided in order to cope with the large variety of types that are present in real systems. To avoid this problem, the type system of the invention supports what is known as polymorphism (meaning 'exhibiting the property of having many shapes'). This means that the techniques of the invention support gems with types that are compatible with a set of other types. As a result, a single gem can be used to process different data types.

Figure 5:
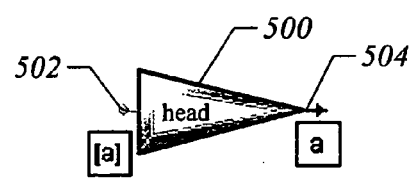
FIGS. 5-7 illustrate gems and associated port labels as used in accordance with embodiments of the invention.

FIG. 5 illustrates an example of a polymorphic gem. FIG. 5 illustrates a gem 500 entitled "head". The gem 500 has an input port 502 and an output port 504. The function being shown (head) returns the first item in a list. The input is the list, and a type expression with square brackets denotes a list of something, where the 'something' is shown inside the brackets. In this case, that 'something' is an 'a'. The head gem 500 takes a list of 'anythings' and returns an 'anything'. The fact that the same letter is used as the type variable indicates that whatever 'a' becomes will be consistent in both the input and output. In other words, if one uses head on a list of double precision numbers (denoted: '[Double]'), one would expect the return to be 'Double'. The feature of using type variables in the type expressions is referred to herein as parametric typing.

The act of creating a new gem or a data transformation block from a collection of other gems is referred to as 'composition'. As demonstrated below, a gem is composed by dragging the output of a 'source gem' to an input on a 'destination' gem. Actually, the concepts of source and destination are a little false, because what you end up doing is creating a new function whose meaning is a perfect combination of the two gems (i.e., there's no 'first' and 'second' really).

Figure 6:
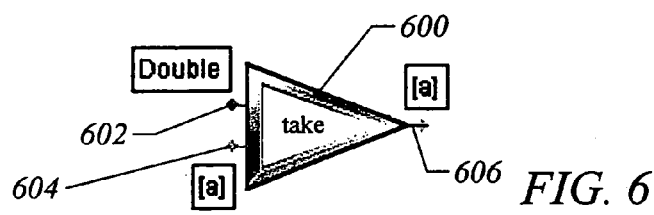

The following example composes a function or data transformation block that adds up the first n elements of a list. To do this, one first needs a function to extract the first n elements. In this example, this function exists in the standard library of gems, and is called take. The take gem or discrete logic visual icon is shown in FIG. 6 with textually marked input and output ports. In particular, FIG. 6 illustrates a take gem 600 with a double precision, floating point number input 602 and a list input 604. The gem 600 produces a list output at port 606. Thus, 'take' receives a list of 'anythings' and a double precision number (the number of elements to take from the list). The gem then provides a list of anythings (the list of the first n elements).

Figure 7:
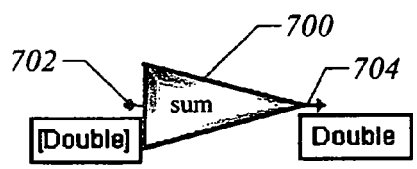

In order to add these elements, we need another gem to sum the values in the list. A sum gem can be used for this purpose. FIG. 7 is a graphical representation of the sum gem. In particular, FIG. 7 illustrates a gem 700 with a double precision input 702 and a double precision output 704. Thus, the function takes a list of double precision numbers and returns a double precision total.

In this example, the goal was to compose a function that will take the first elements of a list and then sum them. Therefore, one must attach the output of take into the input of sum. Notice that we can tell this is possible in two ways.

First, the input type of sum is a more specific type of the output of take. The type [Double] (a list of Doubles) is clearly a more specific version of [a] (the general list of 'anythings'). So one can infer that the gems can be connected. One can say that the types are 'unifyable'.

Figure 8:
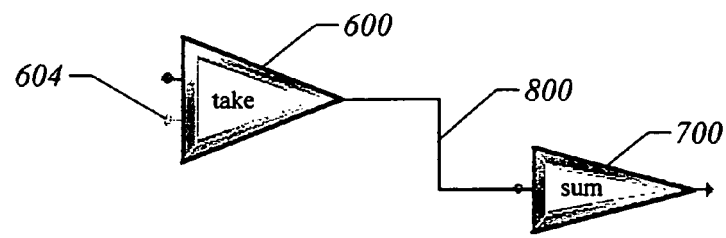
FIG. 8 illustrates the process of connecting gems in accordance with embodiments of the invention.

Second, one can actually establish the connection in the graphical environment to establish its efficacy. This is achieved by dragging a link from the output of take to the input of sum, as shown in FIG. 8. FIG. 8 illustrates the take gem 600 connected to the sum gem 700 via link 800. Under the control of the combination control module 60, as the mouse nears the input, the cursor preferably change to one of two icons, to indicate either that the connection is possible (the types are compatible), or that this connection would be illegal. In a preferred embodiment, the combination control module prevents any type of illegal connection between two gems. In this case, the types are compatible, and when the mouse button is released, the link 800 changes form (e.g., thickness or color) to indicate a valid connection.

The change in form indicates that the two gems are now bound. In fact, although the distinction between the two gems is preserved, we have in fact created a new function object and in effect there is no longer a concept of an output on take and an input on sum. Therefore, there are no types associated with these any more.

There is one more interesting point to note about the resulting graphical representation of the combination we just made. The second input to take 604 preferably changes form (e.g., shape or color) to indicate that its type has changed. In fact it has changed to the same form as the original input of sum. The combination governing module 60 recognizes that take is required to produce a list of double precision numbers as output (by being bound to sum which has this as an input requirement). This implies that it in turn must collect a list of double precision numbers (instead of any old list) in order to satisfy this requirement. It therefore advertises this fact with a change in its input type.

The foregoing discussion introduced gems (discrete logic visual icons) and combinations of gems (data transformation blocks). The following discussion more particularly describes the environment in which to select and combine gems.

Figure 9:
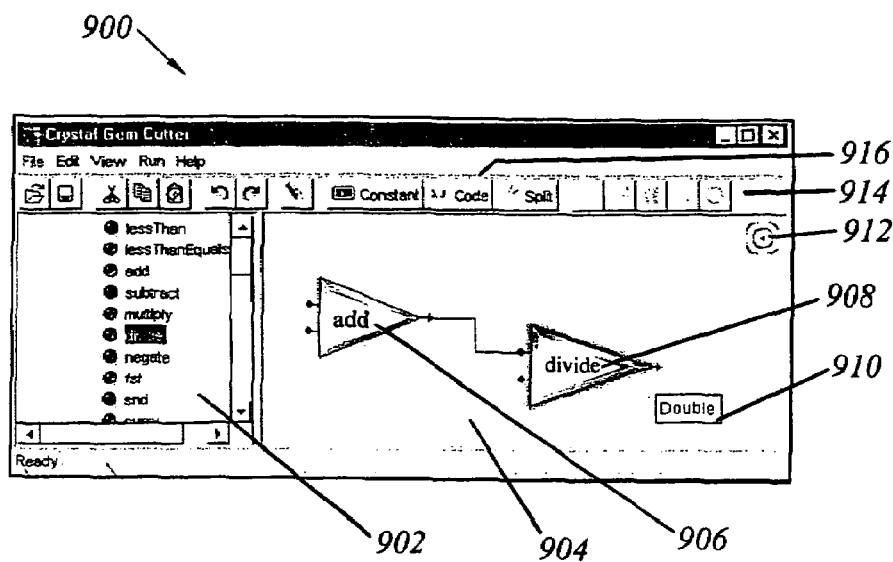
FIG. 9 illustrates a graphical user interface that may be used in accordance with an embodiment of the invention.

As previously indicated, the logic manipulation module 56 provides a design-time environment for creating data transformation blocks 54 from an original set of visual icons 52. FIG. 9 illustrates graphical user interface 900 formed by the GUI module 58. The GUI 900 has a browser section 902 and a tabletop section 904. The browser section 902 displays gems stored in the logic repository 50. The tabletop section 904 is the working area where gems are combined. FIG. 9 illustrates an add gem 906 and a divide gem 908. The figure also illustrates a port flag 910 indicating that the output of the divide gem 908 is a double precision, floating point number. FIG. 9 also illustrates a result target 912, which constitutes the output port of the combined logic. The GUI 900 may also include execution controls 914 and a special gems pull-down window 916.

The gems are stored in one or more repositories. Preferably, they are organized categorically. Access to groups of gems can be controlled such that only selected individuals can modify them. Gems are conceptually stored in Vaults, which are ultimately some form of physical storage mechanism (like a file or database). Vaults may well have visibility and access restricted so that only certain people, groups or roles have access to them.

Inside a Vault are Drawers. Drawers are an organizing principle that categorizes gems based on overall function. For instance, there may be a drawer for the very basic gems and data types (which must always be visible) and other drawers for list manipulating gems, data access gems, and business modeling gems.

When libraries of gems are created to produce custom analyses for groups of people within the enterprise (like financial modeling for the Finance Department), these are placed into a new drawer. The new gems may be published to the target audience using enterprise security to lock the availability of the drawer (and perhaps the vault) for exclusive access to the target consumers. Drawers can also be used to separate 'work in progress' gems from 'production' gems.

A new gem is defined on the table top 904. Gems are combined to form a new function. Any input ports left unbound are treated as inputs to the newly created Gem. Once composition is complete, the new Gem is 'defined' by connecting the final output to the result target 912.

Figure 10:
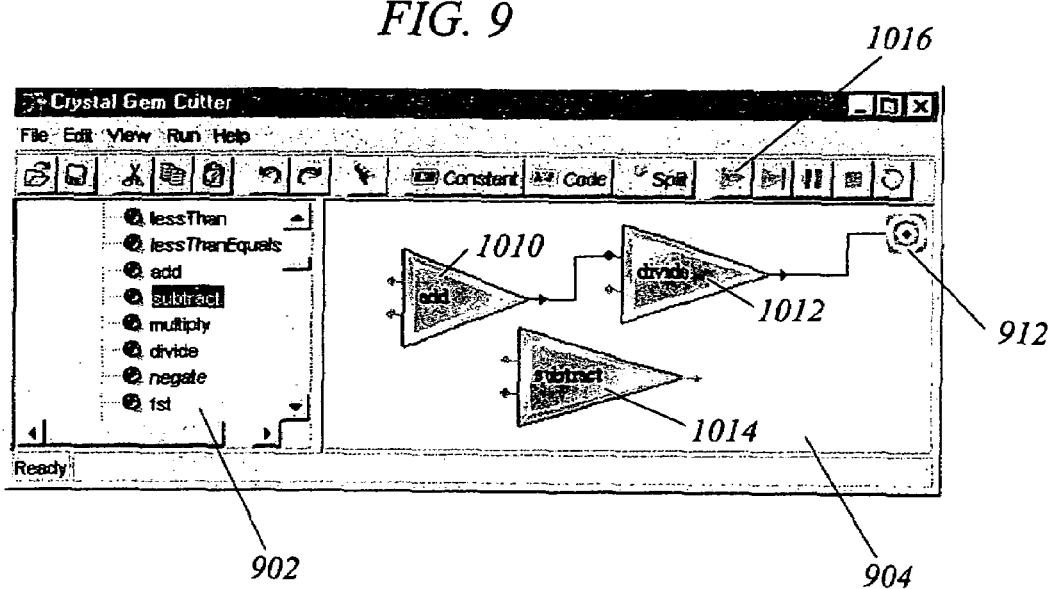
FIG. 10 illustrates the process of connecting gems to a target in accordance with an embodiment of the invention.

To compose gems together, a connection line from the output of one gem is dragged to an input of another gem (or to the target gem). FIG. 10 illustrates gems connected by this process. In this example, the add gem 1010 and divide gem 1012 from the repository are composed together to form a new function. The output of this function is connected to a result target 912 that identifies this composition as being a new Gem. Notice that the subtract Gem 1014 plays no part in the add-divide composition and is therefore not part of the gem under construction. This iconic form of programming is very simple. Therefore, the invention allows large numbers of individuals in an organization to generate logical analyses of data.

When the output of the composition is attached to the result target 912 the logic manipulation module 56 identifies that the new gem is available for testing and the 'play' button 1016 is illuminated on the toolbar. At this point, the user may test the gem or name the gem and save it to a vault.

Figure 11:
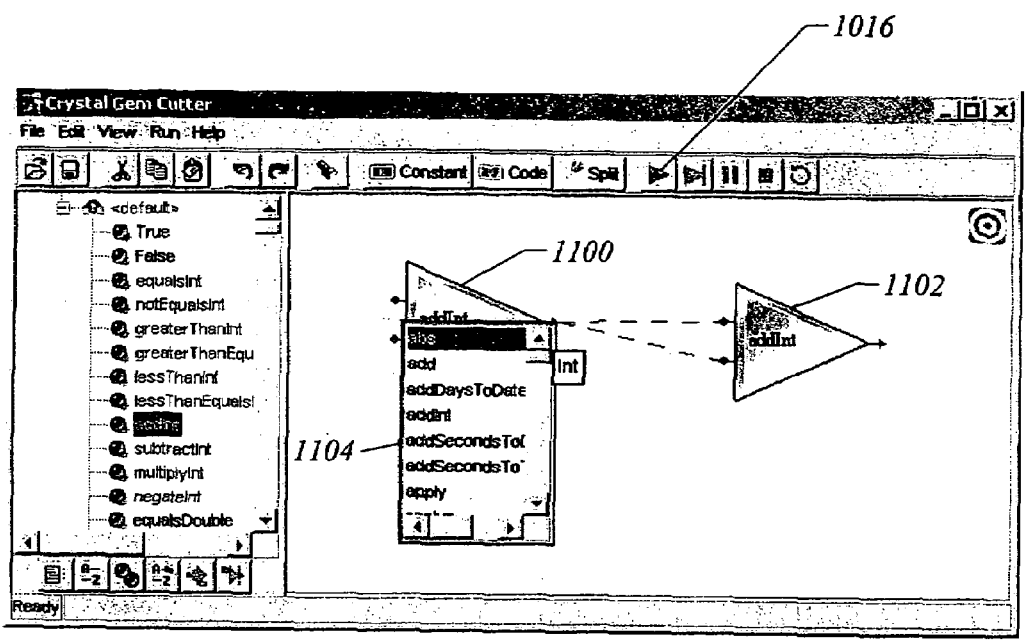
FIG. 11 illustrates different data type options associated with a gem utilized in accordance with an embodiment of the invention.

As shown in FIG. 11, the logic manipulation module 56 preferably provides a feature that facilitates the gem construction process. In particular, placing a mouse pointer over a gem connector (input or output) preferably causes a window to be displayed. The displayed window lists gems that can be legally connected to the specified connector. For example, the window can suggest connections to other gems already on the table top. The window can also list gems that can be brought out onto the table top.

FIG. 11 shows that the user has let the mouse pointer hover over the output of the first (addInt) gem 1100. The program responds by showing that legal connections can be made to both the inputs of the second addInt gem 1102, or to a list of gems not yet on the table top. The list of gems is shown in window 1104. At this point, the user can click on a gem in the pop-up list 1104 to load a gem onto the table top and automatically connect it to the output of addInt gem 100. Alternately, the user can click on one of the indicated inputs to the second addInt gem 102 to form a connection to that gem. If the user moves the mouse away from the pop-up list 1104, the list is preferably closed in order to provide better visibility.

Figure 12:
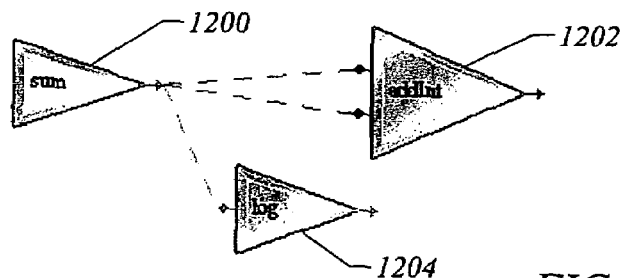
FIG. 12 illustrates different data type combinations that may be established between different gems.

The combination control module 60 observes the type rules of the invention and suggests valid connections based upon compatible types. An example of this is shown in FIG. 12. FIG. 12 illustrates the gems on the table top that can be connected to the output of the sum gem 1200. The sum gem's output is actually typed as a 'number' (typeclass Num) which includes both integers (type Int) and floating point numbers (type Double). In this example, the combination control module 60 determines that both the addInt gem 1202 (taking Ints) and the log gem (taking a Double) can both be legally connected to the output of sum gem 1200. The form of the drawn line (e.g., its color or shape) can be presented to indicate that the connections are compatible, but not the same type.

Figure 13:
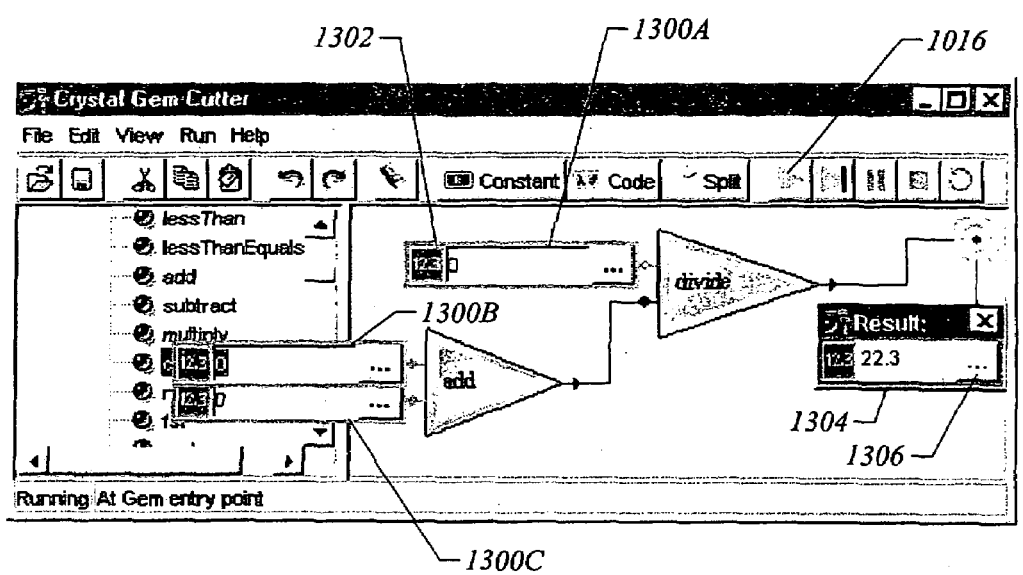
FIG. 13 illustrates value entry panels utilized in accordance with an embodiment of the invention.

Once a new gem has been defined (connected to a result target), the new gem is generally available for testing. Testing can be initiated by activating the 'play' button 1016 on the control panel. The test module 68 is then invoked and solicits the user for inputs to be used during testing. As shown in FIG. 13, three value editors 1300A, 1300B, and 1300C appear to collect values of the unbound inputs of the new gem. In each case, the required type of the input values is a double precision floating point number. To indicate this, the entry panels preferably display an icon 1302 that hints at the appropriate type.

The user can supply values in each panel for the respective argument. In the case of multiple values, each value may be separated with a comma. Alternately, additional windows may be presented to enter the multiple values. All input values are validated to ensure they are legal for the required type. Once the right values have been entered, the user can run or step the gem execution by using the 'play' button 1016.

Once argument values have been assigned the gem is executed to produce a result. The result value may be of a simple type (like a single numeric value), or it could be a data structure, such as a list. In each case, the result can be explored in the result window, which may be in the form of a pop-up window 1304. If the result is of a compound type, then the result can be explored by clicking on the ellipsis button 1306. Doing so expands the result to show more internal structure, for example a list value will expand into a scrollable list control showing all the list members, exactly as per the value entry example just examined.

Constant input values are defined using a constant gem, sometimes referred to herein as a "blue stone". A constant gem has a specific type and value. The constant gem can be connected to a compatible input of a gem to bind this value to the gem.

Constant gems are used to 'de-generalize' a gem, fixing it to deal with a reduced (or specific) set of cases. For example, a filter gem can be fixed to only look for values above 1000, rather than values above any input. Attaching a constant gem to an input removes that input from the set of inputs that will be exposed by the gem under construction when it is saved.

Constant gems use the value entry panels to collect the constant values of the particular type that is asserted by the stone. For example, if the constant gem is set up to be a constant list of floating point numbers, then the list entry panel is used for elements of 'Double' type.

The constant gem contains a value entry panel, just like the panels that pop up when a value is required to test a gem. All constant gems really achieve is to make a value into a part of the gem definition, rather than leaving the gem to collect the value when executed.

Figure 14:
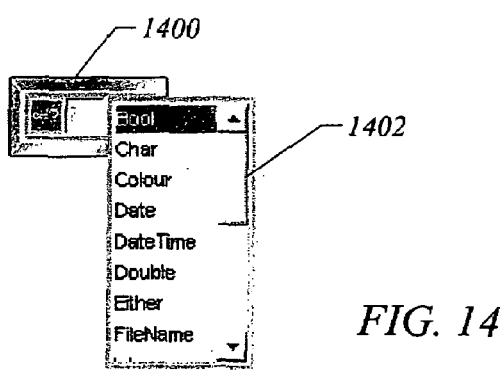
FIG. 14 illustrates constant gem type options that may be selected in accordance with an embodiment of the invention.

Initially a constant gem does not know what type of value it is supposed to be representing. FIG. 14 illustrates a selected constant gem 1400. The type icon and value field showing a question mark indicates uncertainty with respect to type value. Therefore, a type is selected using pull down window 1402.

Another form of specialized gem used in accordance with an embodiment of the invention is referred to as a code gem or a green stone. Code gems are used to inject a specific expression into the gem under construction. More particularly, code gems are code editors for the analytic language that underlies features of the invention. A code gem can therefore be made to represent any user-defined function, including complex functions involving local variables and calls to external functions (in the visible set of Vaults).

The code gem allows one to access the benefits of an underlying language, while still being protected to a large extent from having to understand every nuance of the language. As shown below, in most uses the code gem feels like it is a place to enter simple expressions. However, much more is transpiring. The meaning of the code is dynamically inferred to ensure type correctness and guarantee that the resulting gem is usable and presents the right connectors to the attached gems.

Green stones are functions. To visually represent their status as functions, in one embodiment, they appear as triangular gems on the table top. By way of example, we will consider a customized filter gem to find all list entries with a value greater than 1000.

Figure 15:
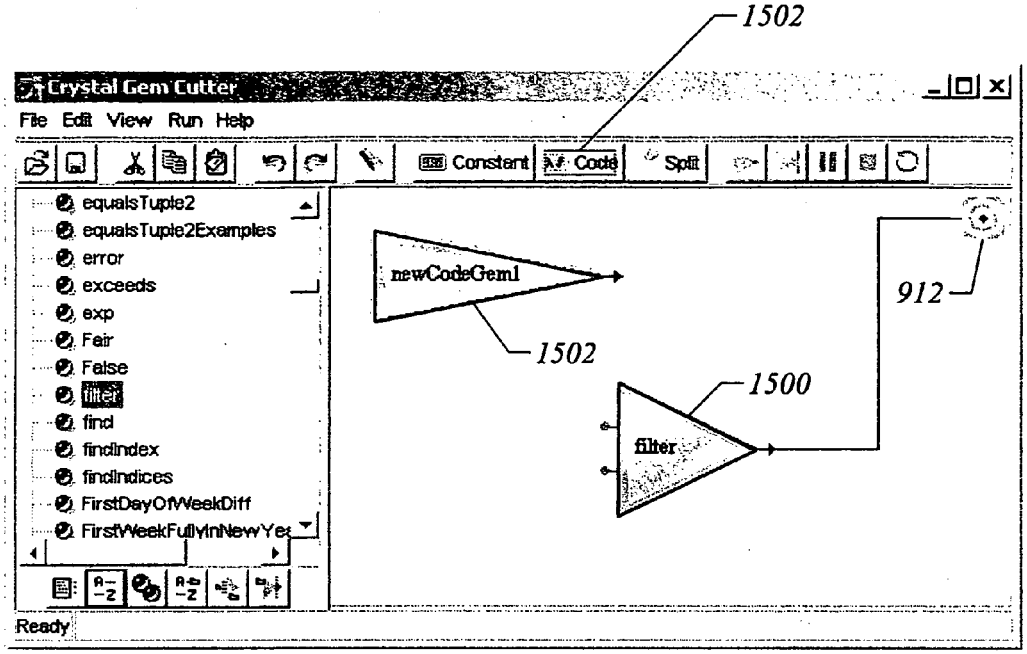
FIG. 15 illustrates the construction of a code gem in accordance with an embodiment of the invention.

Initially, the filter gem is selected from the repository. The output of the filter gem is attached to the result target. FIG. 15 illustrates a filter gem 1500 connected to result target 912.

Pressing the code button 1502 on the toolbar adds a code gem. Technically speaking, we will be creating a lambda expression, which means an anonymous function. Notice that the code gem 1502 of FIG. 15 appears broken. The cracks on its surface are an indication that the gem requires some attention to be useable.

Figure 16:
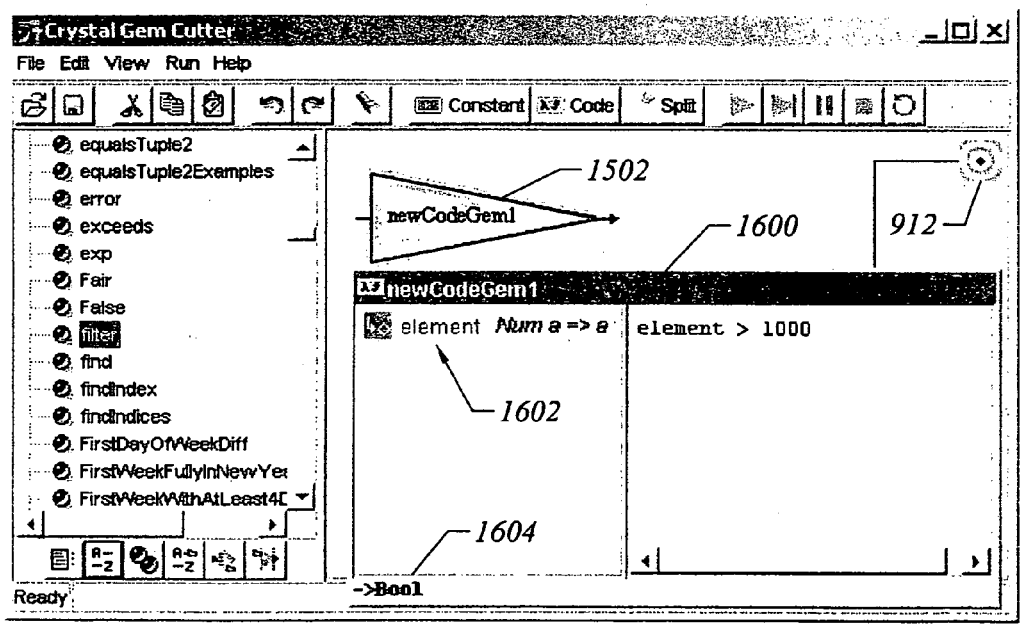
FIG. 16 illustrates a code entry panel for a code gem utilized in accordance with an embodiment of the invention.

By default, when selecting a code gem, an editor 1600 is presented, as shown in FIG. 16. The editor initially associates itself with the code gem 1502 by name and by proximity.

In this example, the function to be described is a test for a value (which will be our list element) being greater than 1000. This code can be expressed as:

element>1000

This code is typed into the editor 1600. The entered code is checked for syntactical correctness according to a predetermined language specification, as discussed below.

FIG. 16 illustrates that various fields appear or change on the editor 1600 to indicate the meaning of the typed expression. First, an item 1602 appears in a panel to the left of the typing area. This indicates that the name "element" has been inferred to be an argument. It also indicates that the type of this argument is inferred as a 'Num' (a number). Num is actually a typeclass and represents either an integer (Int) or a floating point value (Double).

At the bottom of the editor 1600, is the text "->Bool", indicated by marker 1604. This indicates that the output type of the function has been inferred to be a boolean type. Along with the argument, one can observe that a function has been produced to take a Num and produce a Bool. The type expression of this would be:((Num a=>a)->Bool). This is perfectly compatible with the required type (a->Bool); thus, a required predicate function has been created.

Observe that the system attempts to be as general as possible. In the absence of any information to the contrary, the functional language processor 74 of the execution module 70 infers that the most general type that the code will deal with is a number. If we were to force a more specific interpretation by changing the 1000 to 1000.0 (making the number into a definite floating point Double), we would see the type of element change to Double.

Syntax highlighting of the expression text itself gives further visual feedback about how the expression has been interpreted. The fact that the expression has been interpreted in a satisfactory manner is further evidenced by the icon 1502, which no longer has a cracked configuration.

Suppose we wish to construct a gem which will filter the content of a list of numeric values such that a resultant list will contain only those values in the original list which are greater than 1000. In order to do this, we can call upon the services of the filter gem in the standard library, which will take a list of any type and filter the elements in that list according to a supplied predicate function. A predicate function produces a boolean value (true or false) based on an input. In this case, a single element is examined in the original list and is ascribed a value of 'true' if this element should be present in the resultant list or 'false' otherwise.

The predicate function we want is very simple (just a test for being greater than 1000). A standard library greaterThan gem can be selected. The greaterThan gem takes two values belonging to the class 'Orderable' and produces a boolean value.

Figure 17:
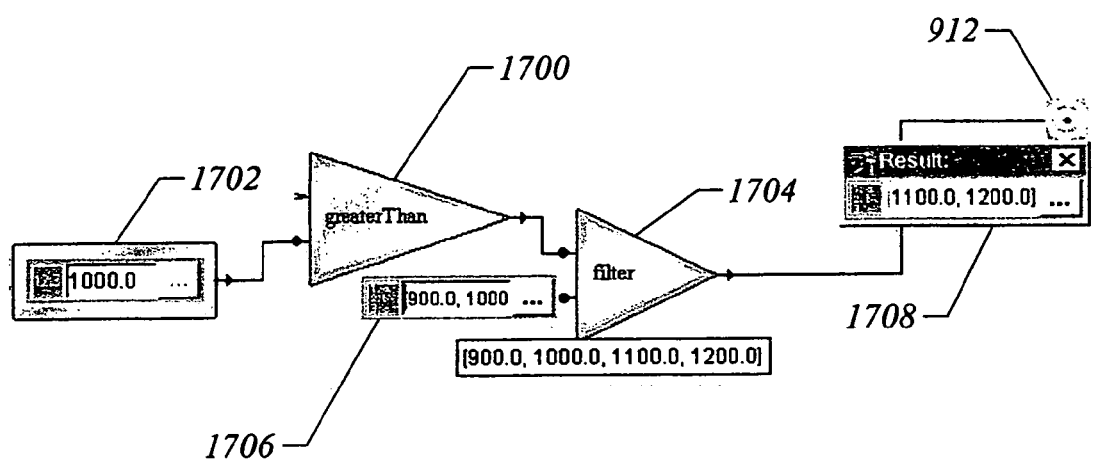
FIG. 17 illustrates gem construction and input burning in accordance with an embodiment of the invention.

One can produce a function that will always test for a value being greater than 1000 by attaching a constant value of 1000 to the second argument of greaterThan. FIG. 17 shows a greaterThan gem 1700 attached to a constant gem 1702. The constant gem 1702 is configured as a floating point number with a value of '1000'.

FIG. 17 also illustrates a filter gem 1704. The output of our 'greaterThan 1000' composite function is a boolean value, but the first input to the filter gem 1704 takes a value and returns a boolean. This implies that we can't take the output of this predicate composite and simply connect it into the filter gem 1704. Actually, this makes perfect sense too, what we actually want is for the whole predicate function to be internally provided with values from the elements of the input list to filter. So, actually, we don't want to externally provide the argument to compare to 1000 at all.

The way to achieve this is by 'input burning', which is performed by the burn module 62. By burning the first argument to the greaterThan gem 1700 one indicates that the gem does not have a single input value. The burning operation of the invention indicates that more than one value will be provided and that this value should be collected when the function is applied to data. We want to create a functional result from the combination of the greaterThan gem 1700 and the constant 1000 supplied in the constant gem 1702. The burn operation may be performed by double clicking on the input to be burned or by some other technique. Preferably, this results in some form of visual alteration in the connection (e.g., the change in size, shape or color of a line or a visual icon, such as a fire).

Once this operation is performed, the output type of the combination is changed to a functional result (a function that takes a floating point number and returns a boolean). This is what is needed for the predicate function for filter. Because this is not a type match for the first argument of the filter function, the 'greaterThan 1000' combination can now be connected to the first argument of filter.

In many cases the mechanics of manually burning the inputs are unnecessary. Because complete and correct type information is always known for gem components, there are many occasions where burning is required, but in many instances the correct input burn combination can be unambiguously inferred by the burn module 62. Thus, the burn module 62 automatically links selected outputs and inputs of different gems when certain predetermined type conditions are satisfied.

In cases where the software is not able to unambiguously establish a connection in this way through burning, it will indicate that a connection is still possible if the user can determine the burn configuration needed prior to connecting. Preferably, the burn module 62 provides a popup window to identify gems that can be connected to a specific input port.

The foregoing technical description identifies a number of important features of the invention. First, the invention provides an icon based programming mechanism. Since the icons obviate the need for writing executable code, a larger group of individuals are in a position to define data processing tasks. The data transformation blocks that are formed during this process may be stored and reused. In addition, these data transformation blocks may be combined with other data transformation blocks and icons to form additional logic operations. These icons or data transformation blocks are easily shared throughout an organization, thereby facilitating consistent data processing operations throughout the organization.

Features, such as the combination control module 60, the burn module 62, and the entry panel module 66 further simplify the programming process. In particular, the combination control module 60 insures that legal operations are being performed at run time, not at a subsequent execution time. Thus, the invention creates a convergence between the development and execution environments where the programmer is constantly assured that valid operations are being proposed. The burn module 62 automatically establishes connections when possible, further simplifying the programmer's task. The value entry panels provide an intuitive interface for delivering data to the data transformation block. The invention is also advantageous in that it facilitates parallel processing in a networked environment.

The benefits of the invention are largely predicated on the underlying functional language source code associated with each icon or data transformation block. Therefore, attention turns to a more complete description of this functional language. The following description of the functional language will more fully illuminate the benefits of the invention.

Underpinning the gems of the invention is a functional computer language and a special runtime for code written in this language. During execution of the functional language expressions are decomposed automatically and can be passed to other runtime environments in order to run parts of a program in parallel. This has a huge potential upside in terms of scalability, but there's also the less obvious benefit of being able to move code to the data, instead of always bringing data to the code. This feature can be called 'automatic pushdown' calculating.

When a gem is to be executed, it pre-loads any argument data into the runtime and then asks the runtime to invoke a named gem by passing it an address referring to the gem. The runtime may not have the gem loaded, so it may have to fetch the gem into memory.

Once the gem is loaded, the runtime begins executing it, and this may require loading other dependent gems in the same way. The runtime may choose to split the processing of the gems it needs to run by passing some of the processing to other agents. This all happens completely transparently from the point of view of the component requesting the original gem execution. The distributed processing module 72 coordinates this operation.

Eventually, a point is reached where the gem is fully evaluated (this is usually when an actual result value becomes available). At this point, the calling component is informed that the processing is complete and can collect the result data.

Type descriptions are fairly straightforward to decode. They describe a type in a concise textual form. For functions, type descriptions deal with describing the 'type contract' of the function, and this can be broken down into types for each input and output. First consider the types of some simple values:

| Type Description | Meaning |
| --- | --- |
| a | A type variable, meaning 'any type' |
| Double | A double precision floating point number |
| Char | A character |
| Bool | A boolean value |

These types are referred to as 'scalar' types since they characterize a single discrete value. Type variables are very powerful as they allow one to describe whole groups of types where one can assume that all the type variables with the same letter can be replaced with any type description (but the same one for a given letter).

Other types that may be used in accordance with the invention include abstract types:

| Type Description | Meaning |
| --- | --- |
| [a] | A list of values. Every value is of type 'a' |
| (a, b) | A pair of values. The first value is of type 'a', the second value is of type 'b' |

These elements will often have their type variables set to specific types. For instance, a list of characters (a string) will be [Char], and a pair of floating point values would be (Double, Double).

Types can include type class constraints. A type class is a type subset for which all members are types and conform to having certain functions defined over them. For example, the Num type class has members Int and Double and has all the simple arithmetic functions defined. Thus, addition, subtraction and other arithmetic can be performed on both Ints and Doubles. By using the Num typeclass we can provide a single definition of add, and implement versions of it which work on Ints and Doubles to adhere to the 'contract' of membership of the Num typeclass for both Int and Double. Thus, a single data transformation block can be used with multiple data types. This feature of the invention significantly reduces the overall number of icons that need to be stored in the repository.

Here are some examples of type class constrained type descriptions:

| Type Description | Meaning |
| --- | --- |
| Num a => a | A value which conforms to being a 'Num' (number). The member types of Num are Int and Double, meaning that 'a' can either be an Int or a Double. |
| Ord a => a | All the 'a' type must conform to being an ordinal type, meaning one that supports ordering functions. |

User defined types (and types for which there are no special syntactic treatments) are described in type descriptions by their type names. Here are some examples:

| Type Description | Meaning |
| --- | --- |
| Tree a | A tree type (from the standard Prelude). The tree will hold values of type 'a' |
| Ordering | An enumeration of comparators |

Finally, functions are described by their type descriptions enclosed in parentheses. Here are some examples:

| Type Description | Meaning |
| --- | --- |
| (Int -> Int -> Int) | A function which takes an integer, then another integer and produces an integer |
| ([Char] -> Int -> Char) | A function which takes a list of characters, then an integer and produces a character |
| (Ord a => a -> a -> a) | A function which takes two ordinal values and returns an ordinal value |

The foregoing can constitute a full list of ingredients for type expressions. Now let us turn to some examples.

| Type Description | Meaning |
| --- | --- |
| ((a -> Bool) -> [a] -> [a]) | A function which takes another function (which takes any type and returns a boolean) and a list of any type, and which returns a list of any type. All the 'any types' must be the same when this type is used. |
| ([Char] -> Int -> Char) | A function which takes a list of characters, then an integer and produces a character |
| ((a -> b) -> [a] -> [b]) | A function which takes another function (which takes one 'any type' and returns another 'any type') and a list of any type, and which returns a list of any type. Notice that in this case, whatever type the first argument of the provided function is must be the same type as the elements of the list in the second argument. Also, whatever type the second argument of the provided function is must be the same type as the elements of the returned list. |
| ((Ord a, Eq b) => (a, b) -> [a] -> b)) | A function which takes a pair of values, being a type which is a member of the typeclass Ord and a type which is a member of the typeclass Eq. The function also takes a list of values of the first type the same as for the first value in the pair. The function returns a value typed the same as the second value in the pair. |

The design emphasis of the functional language is on simplicity and a very close affinity with the nature of the runtime environment. Attention is initially directed toward distinctive aspects of the language. Subsequently, a more formal description of the language is provided.

The functional language preferably has very few keywords and constructs, and very little specialized syntax. The functional language emphasizes the definition of the problem rather than the list of steps the computer must perform to solve the problem. A language whose code resembles a formal declaration of a problem is known as a declarative language. Such languages are usually much more succinct, and being much closer to a formal definition, they provide greater confidence in the correctness of the resulting program.

The following syntactic elements characterize the functional language of the invention. First, the language uses functional language and definitions. That is, a program is essentially a collection of function definitions.

The functional language has data constructors. Data structures are formed with data constructors. Data constructors collect a series of values and build them into an abstract data structure.

The functional language also has data declarations. Data declarations are used to extend data types on which functions will operate. Each time a new data type is described, the data constructors necessary to build the data structure are also defined.

The functional language also provides a module system to organize groups of related declarations. All declarations exist in a module and their names are qualified by the module name to refer to them from outside their module.

Finally, the functional language of the invention includes type class definitions. Type classes are sets of types that have a contract defining what functions are guaranteed to operate over all member types of the set.

Having introduced these characteristics of the language of the invention, attention now turns to a more detailed discussion of each of these characteristics. Initially, attention is directed toward function declarations and definitions.

Mathematically, a function is something that maps one set onto another set. The following is an example:

divide a b=a/b;

This is a function to divide two numbers together. The function definition begins with the name of the function. This must begin with a lower case letter, and can then be composed of letters (upper or lowercase), numbers and the underscore character (_).

After the function name comes the argument list. This is a list of argument names that will be used within the body to describe the meaning of the function. An equal sign signifies the end of the argument list and the beginning of the function's body.

The function body (or expression) describes the meaning of the function. It's important to start thinking about this part being a declaration of the meaning, rather than a list of things to do (which is the way you generally think about the definitions of functions and procedures in imperative languages like BASIC and C). In this example, we are using the '/' operator (which is the name of the built-in division operation) to define this function in terms of the division of a and b. Finally, the function definition is ended with a semicolon.

Here are some other examples of function definitions:
--recip: Calculate a reciprical
recip x=1/x;
--pi: An approximation of pi
pi=3.141592;
--second: Take the value of the second argument
second a b=b;

In the above examples, a line comment is included. A line comment is text starting with two hyphen characters (--) and terminating at the end of the text line. Like any computer language, comments are used to amplify the meaning of the code where this is necessary to describe the intention of the programmer and to highlight special cases, limitations, choices or algorithms.

Notice how the pi function does not take any arguments, so it has an empty argument list. Also, note that we don't have to use all the arguments in the argument list in the function body expression. It is acceptable to ignore declared arguments in the definition, although it is not often that this is meaningfully used as part of the function definition.

In order to write useful functions, we have to be able to express conditions in the definition and employ other function applications as part of the function's definition. To apply a function, we simply invoke the required function by name, followed by values for the arguments. The compiler (e.g., the functional language processor 74) assumes that any list of objects directly after a function name identifies the arguments of the function application. This means one can write an application of the divide function like this:

divide 12.0 4.0

However, if we wish to use a sub-expression in the application, parentheses are required:

divide (20.0−8.0) (2.0+2.0)

divide (second 20.0 12.0) (2.0+2.0)

In the last example we used an application of the second function in the application of the divide function.

In accordance with the invention, condition syntax is just another function. For convenience however the language adds a bit of syntax to help make things a little clearer (and more like other languages). The term if takes three arguments: the condition, the expression yielding the result if the condition is true, and the expression for when the condition is false. Unlike other functions, the keywords then and else are used to separate the three expressions.

Here are some examples of if with some accompanying notes:

divide_without_error a b=if b !=0 then divide a b else 0;

Ignoring the appropriateness of suppressing a divide by zero error in this way, this function checks if the divisor is 0 and returns 0 if this is true, otherwise it performs the division. Another example function is:

abs x=if x>=0 then x else negate x;

The absolute value of x is x itself if x is positive (or 0), otherwise the value of abs x is negate x, where this is a standard function designed to switch the sign of a value.

The functional language of the invention also supports recursion. Recursion is the technique of a function calling itself as part of its definition. Many functions have a natural sequence where the value of the function for a given input value is related to the value of the function where the argument is one less (or more). You can think of this as defining a table of values of the function for different inputs, where the function is defined in terms of the previous line in the table.

An example of recursion is a function that will calculate the factorial of a number. The factorial of a number is the product of all the counting numbers up to (and including) the number itself. A factorial table follows.

| Input (n) | Result (factorial n) |
|---|---|
| 1 | 1 |
| 2 | 2 |
| 3 | 6 |
| 4 | 24 |
| 5 | 120 |

To create this table, we started with the input 1. A factorial involves multiplying the counting numbers up to the input number. The number one is the base case, as it is the simplest form of factorial. The result is 1 (1 multiplied by nothing else is just 1). After this, we can see that for each new line in the table, we take the result from the line before and multiply it by this input. Thus, the factorial of 3 is the factorial of 2 multiplied by 3.

Knowing the base case and the rule for succession from this case, we can now define a factorial function:

base case:factorial 1=1 otherwise:factorial n=n*factorial (n−1)

Finally we can turn this into a functional language function. We use if to choose between the base case and the succession case, and then just use the right hand side of the case expressions identified above:

factorial n=if n<2 then 1 else n*factorial (n−1);

So far we've dealt with function definitions, and in simple cases this is all you need to write usable functions. However, a strictly typed language is used and all functions have an associated type that describes the types of arguments and the output of the function. This acts as a kind of 'contract' for the function and is used to check that the function is being applied correctly in the rest of the code. Actually, the type system infers the type expression for a function if the type declaration is missing. However, it is still good form to provide this as it specifies what the programmer intended and it provides more information for users of the function. A type declaration is also required if the programmer wishes to make a function more specific than it ordinarily would be inferred to be.

A function type declaration can occur anywhere in the same code source as the function definition (e.g., file). Here's an example for the factorial function:

factorial::Int->int;

The only part of this that is truly significant is the type expression piece. For the time being we can assume that this is constructed from the type names of all the inputs and outputs, separated by the arrow symbol (composed of a hyphen and greater-than character). In the case of factorial, we are saying that the function takes an 'Int' and returns an 'Int'. 'Int' is the basic integer type.

Typically we would place the declaration just before the definition. Here's an example with the divide function we saw earlier:

--divide takes two numbers and divides a by b (a/b)

divide::Double->Double->Double;

divide a b=a/b;

Notice again how the type names for the arguments and the return value are separated by the arrow symbol in the type expression. You may think that separating the arguments with an arrow in this way is counter-intuitive, but we'll see later that there is good reason for this.

Another attribute of the functional language of the invention is the use of data constructors. In order to build instances of more complex data types out of simpler values, data constructors are used. These are defined in data declarations, as discussed below, and have names beginning with a capital letter. To create an instance of the data type to which they refer, you invoke a constructor (which also begins with a capital) with whatever arguments it requires as 'parts' of the data type to be constructed. Some critical types are treated specially, which provides a more natural syntax for creating data of the type, rather than using a named constructor. These include the list types, the character type, the string type (list of characters) and tuple types.

Assume the type Pair is defined as a set of two values. It follows that the constructor for a Pair should collect the two values to create an instance of a Pair. Thus, this is reflected in the syntax:

... Pair 1.0 2 ...

Putting this into a real context, consider what a function would look like to create a Pair from a given Int value and its factorial:

--A function to create a Pair of a value and its factorial.

valFacPair::Int->Pair;

valFacPair n=Pair n (factorial n);

The main points to notice are the type expression for valFacPair, which describes the function as taking an Int (integer) value and returning a Pair. Also, in the function definition, the Pair constructor is used to collect the value 'n' and the factorial for this value into a new Pair instance.

Many types have multiple constructors that you can use to create values of the type. As observed in connection with data declarations, the normal definition of a Tree (binary tree abstract data type) describes two constructors: Leaf for the end points and Branch for a non-terminal point. These have different arguments, with a Leaf requiring a value to hold the node data, and a Branch requiring two Tree arguments of a given type (it defines how the tree splits into two branches).

Another simple example is the built-in type Bool. This is the type for boolean values, and accordingly it has two constructors: True and False. Neither of these require any arguments, the use of the constructor itself is enough to provide the two possible values of Bool. Note also that Bool is a very simple enumeration type, providing for 2 legal values of the type. Here is an example of a function that always returns the true value:

alwaysTrue::Bool; --declare alwaysTrue to return the Bool type alwaysTrue=True; --create a True boolean value The functional language deals with strings, tuples and lists in a special way, providing syntax for constructing values of these types in more convenient ways than using the regular constructor syntax. We'll take these in turn and learn about how to create and manipulate these types.

Lists are arbitrary length chains of values. They are considered to have a 'head' (the first element) and a 'tail' (the rest of the list). Most list manipulation is based on this principle. All the values (elements) of a list must be the same type, but this can be any data type so lists of tuples are common. The syntax for creating a list uses square brackets:

... [1,2,3] ...

The language of the invention also provides convenient syntax for describing the head:tail split. Adding a new element to the front (head) of another list can create a new list. To do this, a colon is inserted between the values for the head and tail of the list. Here are a couple of examples:

... 1:[2,3] ...

... myValue:myList ...

Characters are created using single-quotes around the character representation. This is very similar to other languages:

... 'A' ...

Strings are treated as lists of characters. Using double-quote-delimited character sequences can create them. Once created, the string can be manipulated like a list (with any of the list functions) and used in list constructors. Here's a straightforward example of creating a string:

... "hello" ...

Tuples are collections of (possibly differently typed) values. They are roughly analogous to structure or record types in other languages. Tuples can be created using parentheses around the required data elements. The simplest 'sensible' tuple is the pair. Although we earlier described a situation with a user-defined Pair type, this is actually built in as type of tuple (the 2-tuple). A pair using the built-in type can be created as:

... (1.0, 2) ...

Other tuple types are written in the same way, with different numbers of elements for a 3-tuple (triple), 4-tuple etc. For example, a 4-tuple might be constructed thus:

... (1, 2.0, "three", ['f','o','u','r']) ...

Sooner or later in any strictly typed language, you have to be able to define new types of data. A strictly typed language requires that all data be typed so that proper checking can be performed in the compiler. The compiler ensures that the program behaves correctly and as intended by the programmer. The basic trade-off is that the programmer is forced to be more specific about what types of data are stored and processed in return for the compiler being much better able to indicate when the program does not make sense. In large programs or developments with multiple programmers this is an extremely valuable service.

The language of the invention provides quite a few data types that are either built-in, or are declared in the standard library (known as the Prelude), which is usually included before any other libraries or user code is compiled.

To define a new data type, a data declaration is used. This will define the new type and describe the type in terms of constructors and type variables. This is illustrated by looking at a type declaration from the Prelude:

data Bool=False|True;

This declares a new data type called Bool, which is either False or True. False and True are the constructors for the new Bool type. In this case, these two constructors do not require any type of parameter. The vertical bar separates the two alternatives. This sort of type is also known as an enumeration.

The language of the invention has a parametric type system, which means that you can define types that are actually whole families of types. In other words you can define types that are types of something. For example, to define trees of things, we can define the following Tree type:

data Tree a=Leaf a|Branch (Tree a) (Tree a);

Translated into English this says: a Tree of a's is either a Leaf constructed out of an a, or a Branch constructed out of two Trees of a's.

When we come to use this Tree type, we will use one of the defined constructors for the type (either Leaf or Branch) and we will provide a parameter for the type variable 'a'. Whatever is provided for a will set the type of the Tree andthis in turn will fix how we use the Tree in other expressions.

So, if we create a new Tree with the expression:

... Leaf 12.3 ...

we will end up with a Tree of floating point numbers (which could be written Tree Double). The type variable a is instantiated now and this means that we will only be able to use this instance of a Tree in other expressions dealing with Trees of Doubles.

This means that:

... Branch (Leaf 12.3) (Leaf 0.0) ...

is legal, but:

... Branch (Leaf 12.3) (Leaf "my leaf") ...

is not as we are mixing types (the a type variable stands for a different type in the two parameters of the Branch constructor).

To create structures (or records as they are called in some languages), we simply create lists of the types we wish to build into the structure. These sorts of types are called products.

We can even mix products and enumerations. Relying on the last example, there is a definition of Shape that can be either a Circle or a Rectangle. Having two alternative constructors provides this choice. To define the Circle, we have to provide a radius and to define a Rectangle we have to define a width and height. This is described by having each constructor take type parameters to collect the appropriate data. Circle and Rectangle are thus products of their constituent types. Here is the code:

data Shape=Circle Double|Rectangle Double Double;

Comments to annotate data declarations may look like this:

data Shape=Circle Double| --radius of circle
        Rectangle Double Double; --width, height We'll deal with data declarations in more detail later. For now, we'll move onto the final major component of the functional language of the invention, modules.

In order to write big programs, and in order to categorize core functions into libraries, a programming language needs a way to allow programmers to structure code into named 'packages'. In the functional language used in accordance with the present invention, these are called modules.

Modules are simply an extension to the namespace for functions and data declarations which allows you to give a long (or fully qualified) name to entities. Top level identifiers therefore break down into two parts:

<module name>.<entity name> for instance:

statistics.mean would be a mean function in the statistics module.

When the language is being compiled from a file or other source code storage, the module keyword changes the module into which subsequent functions and data declarations will be compiled. The names of these entities are then effectively prefixed with the module name and stored in the module: module Prelude;.

Modules define a context (or scope) for definitions. One of the nice features they provide is a way to hide definitions for use within a module (like utility functions and building blocks for the 'real' top-level functions). The invention allows one to specify whether a declaration is visible outside of the module in which it is defined by using the keywords public and private. A public definition is visible outside of the source module, whereas a private definition is not. If an entity is not declared to be public then it is implicitly private to its module.

In order to access public declarations from another module, an input statement must be present before the use of declarations foreign to the module using them: import Prelude;. Providing the use of a name is unambiguous, an entity (function, data declaration, etc.) can be referred to without qualifying it with the source module name. If this would result in ambiguity however, then the qualified name must be used to avoid a compiler error. If a locally defined entity has the same name as one imported from another module, then using the unqualified name will refer to the local entity, and a qualified name is the only way to refer to the imported entity.

Type classes are named sets of types for which a guarantee is made about the availability of functions to perform certain actions for all member types. Having such an abstract grouping of types is very powerful as it allows functions to declare that they will work on the type class and therefore on all member types this infers. A simple example of this is the type class Ord (orderable). It defines a set of comparator functions (such as the standard <, >, >=) which will be made available for all types which are members of it. It is possible (and very desirable) for many types to have a way to compare values of themselves. For instance, to write real programs, we have to be able to compare number values, we also would like to lexicographically compare strings and characters. So, what we do is make sure that the Org class defines all the comparator functions, and make all the types (Int, Double, Char, string etc) members of the Ord type class. Part of declaring a type as a member of a type class involves nominating functions that will perform the operations defined in the type class for values to the member type. This work is done by the instance declaration.

The upshot of this work is that one can use the 'generic' comparator functions defined over Ord for any of the types that are instances of Org (members of it). This makes the code much cleaner and more readable, and is a huge service to the programmer who no longer needs to locate an appropriate function to compare each specific type (greaterThanInt, greaterThanDouble etc.). Furthermore, this allows the language to share the most intuitive syntax (like operator symbols >, >=, <) across all of the types in the Ord typeclass without sacrificing any type checking.

Attention now turns to a more detailed look at the functional language of the invention. In particular, attention is directed toward consideration of more advanced features of the language.

Even though the language can claim to have 'more advanced' features, it is really a very simple language from most points of view. Fundamentally, the language is a set of declarations of expressions that get compiled. At runtime, the evaluator works out how to reduce this set from a particular entry point (like the main function) to the simplest form possible. Often, this 'simplest form', or result, is a single value, but it can be an abstract data type, or perhaps still a function. Basically, the job of the runtime is to 'boil' the starting expression down to its bare bones by repeatedly using the other function definitions to replace and reduce the current expression. This process stops when the runtime can find no way of further reducing the program.

So, a gem (e.g., a discrete logic visual icon or a data transformation block) is essentially a set of expressions. There's the starting point expression and a set of dependent expressions out of which we have derived this starting point.

An expression is a mathematical term meaning a formalism that describes an entity in terms of a combination of other entities. Most computer languages have syntax for expressions in order to describe arithmetic operations. However, most languages also provide mechanisms and syntax to describe the movement of state in memory (usually through data structure 'proxies'). In these languages, a program works by starting at some entry point and executing a set of commands or instructions one at a time until some sort of 'halt' instruction is met. In these languages (called imperative languages because each instruction must be executed fully as the program proceeds), expressions are merely the vehicle to describe the transformation of values to create new values. In order words, they create and modify the states of the program. The control of the program 'flow' is directed by special instructions and, within this, expressions perform the transformations in the state.

The functional language of the invention omits the 'flow of control' instructions, and does away with notions of global or persistent state. Instead, a program is 'declared' purely in terms of abstractions. Because of this, functional languages have what is known as a declarative syntax. Moreover, the expressions used have extra meaning as functions. Functions map a set onto another set, and for any given input to a specific function, the output will always be the same. This fact can be exploited by a functional language runtime, so that the expression defining a function is never evaluated more than once for given set inputs. This is known as memoisation.

By splitting the program up into a set of functions, we obtain the granularity required to perform the memoisation optimization as described above, and also the granularity required to write 'real' programs.

We'll now look at features of the language more fully and learn where expressions can be written. The main site for an expression is the function body. The function body can consist simply of a basic expression, or of some of the following types of special expression. One type of special expression is a constructor, which builds a more abstract data type from a set of simpler types. Another type of special expression is a LET expression, which is used to define local variables and functions. A SWITCH expression is used to switch between sub-expressions based on a value or pattern. A LAMDA expression is an unnamed function definition.

Each of the special expressions and their syntax will be dealt with in subsequent sections that will discuss the features they provide. In this section we'll continue to talk about the basic expression syntax.

Basic expressions describe a calculation, and hence a resultant value derived from a set of variables, arguments and constants, in terms of functions and built-in operations.

Local variables can be used in a function where this is convenient to express an intermediate result. The syntax to define a local variable is the LET expression. The form of the LET expression is:

Let
  a=12;
  b=sin 90.0;
in
  a*b;

Note that as an expression, the LET block takes on the value of its enclosing expression. Also, the scope of the variables defined in the head of the LET is limited to the expression (i.e. the LET is the enclosing scope).

LET expressions can be nested to arbitrary depth. This allows for the scope of defined variables to be structured appropriately and to add clarity to the overall expression.

Note that the use of local variables is probably a little different than what one might expect if coming from an imperative language background. Local variables are immutable once set in the head of the LET expression. You cannot reassign values to local variables in the LET body. This is in keeping with the functional programming paradigm that rules that objects do not change once they have been created, but new object instances can be made of the same type, but with different values.

Local functions, like local variables are used when it is necessary or meaningful to define a function in terms of one or more private functions. Like local variables, the LET block is used to define the functions and their enclosing scope. In fact, local functions are defined in exactly the same way as value variables. This follows because logically there is no difference between a value and a function. Here's an example of an, albeit tautological, pair of nested LET expressions containing both local variable and local function definitions:

```
doublePlusAndOne x y =
let
    doubleIt x = x + x;
in
    let
        z = doubleIt x;
        addTogether x y = x + y;
        p = 1;
    in
        addTogether z y + p;
```

There are two points worth noting in connection with this example. First, local variable function definitions can be freely intermixed in the head of a LET expression. Next, variable hiding is possible because of the scoping rules. In the example, we reuse the variables x and y in the definitions of doubleIt and addTogether. The most local definitions are used in the application of these variables. The same applies to function names.

A switch expression is the way to choose between a set of alternative expressions depending on a pattern or value. Switch expressions are also used to access data elements in a compound data type (i.e., to 'break apart' a compound value into its constituent pieces).

A lambda expression is an expression that denotes an anonymous function. The name derives from the mathematical symbol used to introduce the concept of an unnamed function, which uses the Greek letter Lambda ($\lambda$).

Lambda expressions are used in Lambda Calculus, which is a calculus that permits the simplification of functional expressions using various forms of reduction. Lambda expressions are interesting in the language of the invention for several reasons. First, there are often times when there is no point giving a name to a local function. A lambda expression is more concise and doesn't require redundant naming of the function. Next, one can build a lambda expression (function) inside another function and return it.

A backslash (\) is used to introduce a lambda expression. This character is chosen because of its resemblance to the Greek letter Lambda. A lambda expression is similar to a function definition, but with a few syntactical differences derived from the mathematical notation (and to differentiate it better).

Here is the form of a lambda expression: \xs n->length xs+n.

Let's look at a simple example of where one might use a lambda expression. Imagine we want to filter a list of double precision numbers to extract only those values which are larger than 1000. We might use the standard filter function to achieve this. This function provides all the logic for describing a subset of a list, but requires a predicate function (a function taking a list item and returning a boolean) in order to 'pick' which items are in the subset.

One approach to this problem might be to write a named predicate function like this:

greaterThanAThousand item=item>1000;

and then apply this to the filter function:

. . . filter greaterThanAThousand myOriginalList . . .

This might be the correct approach if the greaterThanAThousand function was likely to be reused. However, it's likely that its only purpose is for this application. Therefore, it is much better (not to mention more concise) to use a lambda expression:

. . . filter (\item->item>1000) myOriginalList . . .

One of the most powerful and intriguing things about the functional programming paradigm as provided by the invention is the capability to partially evaluate a function, leaving the rest of the function to be passed elsewhere for later complete evaluation.

This is best demonstrated with an example. Consider the previously discussed filter example. To recap, we wanted to express the application of filter on a list to produce a subset of the list where all items were over 1000. Here is the code:

. . . filter (item->item>1000) myOriginalList . . .

This code works well when we want to apply the filter function right away to our list. However, we may want to reuse this particular filter on several lists. We can use partial evaluation in to achieve this.

What we can do is partially apply the filter function by only initially supplying the predicate function:

. . . filter (item->item>1000) . . .

Unlike most languages, which require a full set of required arguments (either provided or defaulted) to perform their task, the language of the invention allows us only to provide a subset of the arguments to filter. This will then produce another function that is unnamed, but represents the concept 'the filter that will pick items over a thousand'. This new function will take the remaining missing arguments (in this case a list of double precision numbers) to do its work, or if there is more than one remaining argument, we could produce yet another derived function, by applying another subset of the remaining arguments.

Partial function applications can be returned from a function, be bound to a local variable, or be stored in a data structure. They can then be applied at a later time to complete their task.

In procedural languages there is a clear distinction between functions and regular values. You are often required to create pointers to functions in these languages in order to be able to manipulate the functions themselves.

In functional languages this is not the case. We can treat functions like any other expression, and in particular we can use them as arguments. No special syntax is required to do this, function parameters look exactly the same as any other kind of parameter. The only way you would know that a parameter is a function parameter is to take a look at the type of the parameter.

We'll examine an example now. Suppose we want to be able to apply any given function twice to a particular argument. We can code this operation as a function called doTwice:

doTwice f x=f (f x);

The body of the definition applies f to x and then applies f again to the result. The type description for this function is:

(a->a)->a->a

This reveals that the function does indeed take a function as its first parameter, the (a->a) being the pertinent part of the full type description.

Using doTwice doesn't involve any extra syntax either:

. . . doTwice factorial 3 . . .

yields 720 as the result.

We could write a generalized version of doTwice that will apply a function a given number of times to an input value. Here's a definition of such a function:

doMany n f x=if n==0 then x else f (doMany (n-1) f x);

As well as acting as an argument, a function can also be the result of evaluating an expression. Here's an example of a function that returns one of two functions depending on an input value:

taxFunction income=if income>10000 then higherTaxCalc else lowerTaxCalc;

One of either the higherTaxCalc or lowerTaxCalc functions is returned depending on the value of income passed to taxFunction. These returned functions have a specific type that controls what we can do with the return of taxFunction. It's quite likely, given this example, that they would take the income and apply a banded tax calculation, returning the total tax liability. In this case, these returnable functions would have the type:

(Double->Double)

This in turn would make the type of taxFunction:

Double->(Double->Double)

What is even more interesting is the fact that the type system of the invention is flexible enough to permit functions as arguments and return polymorphic functions.

Now that the iconic and functional language aspects of the invention have been fully described, it is useful to more carefully consider previously introduced concepts. As previously indicated, the combination control module 60 only allows compositions that are legal and that result in unambiguous meaning. In other words, to get from state "A" of a gem to another state "B", it must be possible to describe the meaning of "B" in a well-defined manner in the underlying functional language. In addition, the transformation A->B must be able to produce a new global typing of B that is expressible in the type language. Further, there must not be any violations of type constraints and bindings already established at A.

There are instances in which the combination control module 60 detects a supposedly "illegal" connection attempt. In many of these instances there is a simple transformation of the function that would make it legal. The logic manipulation module 56 supports "partial evaluation". This essentially moves one or more inputs on the function being connected into its output (usually turning the output into a function rather than a straightforward value). This most frequently occurs when a function is expecting a functional input (i.e., it is a "higher order" function) and an attempt is made to connect the output of a regular gem. In this case, the burn module 62 recognizes that if it burns one or more of the inputs on the outer function, it will be able to create an entity that matches the input. When it can do this unambiguously, then the burning is done automatically.

When there is more than one possibility (a set of permutations of burnt inputs), the burn module 62 indicates there is a burn configuration that would qualify the connection, but it cannot determine which is correct. Thus, the burn module 62 moves an input to the output to form a new type out of essentially the same function (by precluding a local value for that input). The burn module 62 suggests these transformations to the user in an ambiguous case and automatically implements the transformations in an unambiguous case.

Value editors 1300 or value entry panels have been described as automatically generating value input based on decomposition of type. The code for the entry panel module 66 may also be used to create the result interface 1304 when a result value is obtained. This allows the user to "drill down" into the result value and see how it is composed.

Another aspect of this automatic decomposition is that it allows new entry/result panels to be "registered" with the system. Preferably, the logic manipulation module 56 automatically spots a type match once the value has been decomposed to the right level, and it substitutes the registered panel to collect or display an abstract value rather than further deconstructing the value.

If there are several suitable panels registered (e.g., an edit panel and a slider panel for setting an integer value), then the logic manipulation module 56 can note this dichotomy. For instance, a default (e.g., edit panel) may be set and a decision may then be made to: (a) use the default, (b) select from another registered panel, or (C) substitute an entirely different panel that will deal with this type of value. This registration feature is also designed to accommodate the fact that one can declare a new type in the language.

It should now be appreciated that new data transformation blocks may be constructed solely through the use of logic icons. The use of logic icons may be supplemented or substituted by the use of a code gem 1502 and its corresponding code entry window 1600. The combination control module 60 also supervises text entry into the code entry window 1600. That is, the combination control module 60 continuously parses and interprets the contents of the entered code and provides feedback as to whether the code makes sense, the interpretation of the code in terms of inputs and output, and the data types.

The foregoing description, for purposes of explanation, used specific nomenclature to provide a through understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, the thereby enable other skilled in the art to best utilize the invention and various embodiments with various modifications as are suited to the particular use contemplated. It is intended that the following claims and their equivalents define the scope of the invention.

The invention claimed is:

1. A method of constructing a data transformation block, comprising:
   selecting a first discrete logic visual icon from a logic repository;
   choosing a second discrete logic visual icon from said logic repository;
   establishing a combination valid state when said first discrete logic visual icon can be combined with said second discrete logic visual icon;
   combining said first discrete logic visual icon and said second discrete logic visual icon in response to said combination valid state to form a data transformation block, said data transformation block having a corresponding functional language source code description of the logical operations to be performed by said data transformation block, wherein the functional language source code description has an algebraic type system and a declarative syntax; and
   storing said data transformation block in said logic repository.

2. The method of claim 1 further comprising:
   selecting said data transformation block from said logic repository;
   choosing a third discrete logic visual icon from said logic repository;
   establishing a combination valid state when said data transformation block can be combined with said third discrete logic visual icon;
   combining said data transformation block with said third discrete logic visual icon in response to said combination valid state to form a new data transformation block, said new data transformation block having a corresponding functional language source code description of the logical operations to be performed by said new data transformation block; and
   storing said new data transformation block in said logic repository.

3. The method of claim 1 wherein said functional language source code description includes a first executable logic code segment corresponding to said first discrete logic visual icon and a second executable logic code segment corresponding to said second discrete logic visual icon.

4. The method of claim 3 wherein said first executable logic code segment is processed on a first computer and said second executable logic code segment is processed on a second computer.

5. The method of claim 1 further comprising applying data to said data transformation block to form transformed data.

6. The method of claim 5 further comprising displaying said transformed data.

7. The method of claim 6 further comprising supplying intermediate processing results prior to said displaying.

8. The method of claim 5 wherein said applying includes:
   applying a first data type to said data transformation block to form transformed data of a first data type; and
   applying a second data type to said data transformation block to form transformed data of a second data type.

9. The method of claim 1 further comprising automatically linking, under predetermined conditions, selected inputs and outputs of said first discrete logic visual icon and said second discrete logic visual icon.

10. The method of claim 1 further comprising establishing entry panel inputs to said first discrete logic visual icon and said second discrete logic visual icon.

11. The method of claim 10 wherein establishing includes selecting a constant value visual icon as an entry panel input.

12. The method of claim 1 wherein establishing includes establishing a combination valid state when type definitions for said first discrete logic visual icon match type definitions for said second discrete logic visual icon.

13. The method of claim 1 further comprising forming a new discrete logic visual icon by:

selecting a discrete logic visual icon template; and
entering into a display screen a functional language source code description of logical operations to be performed by said new discrete logic visual icon.

14. A computer readable memory to direct a computer to function in a specified manner, comprising:
a logic repository storing a set of discrete logic visual icons; and
executable instructions including
first executable instructions to selectively produce a combination valid state when a first discrete logic visual icon from said logic repository is combined with a second discrete logic visual icon from said logic repository, and
second executable instructions to combine said first discrete logic visual icon and said second discrete logic visual icon in response to said combination valid state to form a data transformation block, said data transformation block having a corresponding functional language source code description of the logical operations to be performed by said data transformation block, wherein the functional language source code description has an algebraic type system and a declarative syntax.

15. The computer readable memory of claim 14 further comprising executable instructions to combine said data transformation block with a third discrete logic visual icon to form a new data transformation block, said new data transformation block having a corresponding functional language source code description of the logical operations to be performed by said new data transformation block.

16. The computer readable memory of claim 14 wherein said functional language source code description utilizes type classes.

17. The computer readable memory of claim 14 wherein said functional language source code description processes input data to form transformed data.

18. The computer readable memory of claim 17 further comprising executable instructions to display said transformed data.

19. The computer readable memory of claim 18 further comprising executable instructions to supply intermediate processing results.

20. The computer readable memory of claim 14 wherein said functional language source code description includes a first executable logic code segment corresponding to said first discrete logic visual icon and a second executable logic code segment corresponding to said second discrete logic visual icon.

21. The computer readable memory of claim 14 wherein said data transformation block includes executable instructions to produce a first data type output in response to a first data type input and a second data type output in response to a second data type input.

22. The computer readable memory of claim 14 further comprising executable instructions to automatically link, under predetermined conditions, selected inputs and outputs of said first discrete logic visual icon and said second discrete logic visual icon.

23. The computer readable memory of claim 14 further comprising executable instructions to form entry panel inputs to said first discrete logic visual icon and said second discrete logic visual icon.

24. The computer readable memory of claim 23 further comprising executable instructions to form a constant value visual icon as an entry panel input.

25. The computer readable memory of claim 14 wherein said first executable instructions produce said combination valid state when type definitions for said first discrete logic visual icon match type definitions for said second discrete logic visual icon.

26. The computer readable memory of claim 14 further comprising executable instructions to:
generate a discrete logic visual icon template; and
produce a display screen to receive a functional language source code description of logical operations to be performed by a new discrete logic visual icon corresponding to said discrete logic visual icon template.

* * * * *